United States Patent [19]

Brodmann et al.

[11] 4,260,872

[45] Apr. 7, 1981

[54] CERAMIC IGNITOR

[75] Inventors: Franz J. Brodmann, Philadelphia; Ronald Staut, Bala Cynwyd, both of Pa.

[73] Assignee: General Refractories Company, Bala Cynwyd, Pa.

[21] Appl. No.: 886,064

[22] Filed: Mar. 13, 1978

[51] Int. Cl.³ .............................................. F23Q 7/10
[52] U.S. Cl. .................................. 219/270; 219/260; 219/267; 338/331
[58] Field of Search ...................... 219/260, 267, 270; 338/331

[56] References Cited

U.S. PATENT DOCUMENTS

| | | | |
|---|---|---|---|
| 2,095,253 | 10/1937 | Heyworth | 175/115 |
| 3,058,081 | 10/1962 | Braun | 338/331 X |
| 3,569,787 | 3/1971 | Palmer | 338/316 X |
| 3,662,222 | 5/1972 | Ray | 219/260 X |
| 3,681,737 | 8/1972 | Magnusson | 338/330 X |
| 3,974,108 | 8/1976 | Staut | 252/521 |
| 4,029,936 | 6/1977 | Schweitzer | 219/267 |

FOREIGN PATENT DOCUMENTS 41860 11/1973 Australia .................................. 252/521

*Primary Examiner*—Richard R. Kucia
*Attorney, Agent, or Firm*—Brian G. Brunsvold; David W. Hill; Everett H. Murray, Jr.

[57] ABSTRACT

A fast response ceramic ignitor which is particularly adapted for use with household current as a replacement for gas pilot lights, the ignitor being formed from pure lanthanum chromite, or lanthanum chromite which has been doped with combinations of niobium, magnesium, or strontium ions in quantities sufficient to provide desired electrical resistivity characteristics.

11 Claims, 2 Drawing Figures

CERAMIC IGNITOR

BACKGROUND

This invention relates to ceramic ignitors for gas and liquid fuel burning devices such as furnaces, water heaters, clothes dryers, kitchen stoves, and ranges. Such ignitors are becoming increasingly more important as the world's fuel supplies diminish and improved energy conservation methods are sought. Ignitors of this type are used to replace pilot lights on fuel burning devices, which often account for as much as 30–50% of the total gas consumed. The general concept of electrically operated ignitors is not new, ceramic resistance ignitors having been first used prior to World War II. Early versions of such ignitors were exclusively prepared from dense sintered silicon carbide impregnated with silicon.

However, silicon carbide has a poor resistance to spark erosion at elevated temperatures. Various additions have been made to the silicon carbide by those skilled in the art in attempts to improve these spark erosion characteristics. Other materials such as molybdenum disilicide and tungsten disilicide, have also been used in ignitor applications.

Ignitors designed for use in household applications must have a very short response time. As used herein the term "response time" refers to the time between initial application of current to the ignitor, and the maximum temperature output of the ignitor.

Electrical consumption can be lowered significantly by using a higher resistant electrical conductor, but such a conductor must be capable of achieving the desired temperatures rapidly at line voltage (120 volts) to provide an efficient and economical ignitor for household appliance applications.

In addition, such an ignitor must have a high resistance to thermal shock, a high degree of strength, and must be capable of prolonged service life over more than about 200,000 thermal cycles. In most natural gas household applications an ignitor should be capable of heating from room temperature to about 2600° F. in less than 30 seconds. These properties must be maintained over the full service life of the ignitor, if the device is to be economically useful.

Preferably, the resistance-temperature characteristics of such an ignitor should show a low resistivity at room temperature in order to promote the fast start-up necessary for a heat-up response time of less than 30 seconds. In the high temperature range (about 2600° F.) the negative slope of the electrical resistivity-temperature curve should level off to avoid any overheating of the ignitor device.

In addition to the above characteristics, an ignitor designed for economical household use should not require more than about 100–110 watts of power in normal operation. If the desired response time can be achieved in this range of power demand, the use of electrical ignitors as replacements for pilot lights will result in significant overall energy savings.

Also, the structure of a ceramic ignitor should be such as to avoid any change in resistivity at the connection between the ceramic material and the electrical lead wires in order to increase the service life of the connection. Excessive changes in resistance at this connection point could lead to overheating and a corresponding deterioration of the ceramic-metal joint.

The wired parts of the ignitor should also be protected from the possibility of direct contact with any burner flame, but the heating element must be adequately exposed to the fuel medium for rapid ignition.

Ignitors in the prior art formed from recrystallized silicon carbide have a relatively low resistivity, and therefore require an electric power demand of up to 500 watts to reach temperatures required in fuel ignitor applications. In this situation, the amount of fuel energy savings is wasted due to excessive use of electrical energy.

In addition to their high power demand, discussed previously, the ignitors of the prior art have been unable to achieve heat-up times of less than 30 seconds at line voltage. In general, prior art ignitors respond in 30–60 seconds at line voltage.

It has been discovered that a ceramic ignitor having the requisite strength, temperature, service life, resistance, and voltage characteristics in combination with greatly improved response time, can be constructed from pure lanthanum chromite or from lanthanum chromite which has been doped with specific percentages of magnesium, niobium, or strontium ions alone or in combination.

Particularly, it has been found that an ignitor formed from these materials is capable of efficient operation at line voltage with significantly lower power demand than ignitors of the prior art.

Lanthanum chromite has been used in the prior art in combination with other materials for the manufacture of electrodes and semiconductors as disclosed, for example, in Aubin et al, U.S. Pat. No. 3,730,911. However, lanthanum chromite has not been previously suggested or used for ceramic ignitor construction.

It is also known in the art to modify the electronic properties of lanthanum chromite by doping it with certain metallic ions which substitute for the lanthanum or chromium ions at the A- or B- sites of the Perovskite lattice. Staut et al, U.S. Pat. No. 3,974,108 discloses a method for such doping using strontium, calcium or magnesium ions.

As with pure lanthanum chromite, doped lanthanum chromite has not been suggested or used previously for ceramic ignitor construction.

Accordingly, it is a primary object of the invention to provide improved materials for the formation of ceramic ignitors.

It is a further object of the invention to provide an improved ceramic ignitor which is capable of more rapid heat-up response.

A still further object of the invention is to provide an improved ceramic ignitor which is capable of more efficient operation at line voltage.

Yet another object of the invention is to provide a new and improved ceramic ignitor having a high resistance to thermal shock, a high strength, a prolonged service life, and a faster response time.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purposes of the invention, as embodied and broadly described herein, the ceramic ignitor of this invention comprises a ceramic holder block; an electrically conductive body mounted in the block and having the composition $La_{1-x} Sr_a Mg_b Nb_c CrO_3$ where $x=a+b+c$ and $a=0$ to 0.2, $b=0$ to 0.5, and $c=0$ to 0.05; and means attached to the body and mounted in the block for transmitting an electric current therethrough. The holder block includes at least one opening for exposing a tip portion of the body to the medium to be ignited. A composition in which $a=0$ to 0.02, $b=0$ to 0.05 and $c=0$ to 0.005, is preferred.

It is preferred that the electrically conductive body or ignitor element has a composition containing amounts of both magnesium and niobium sufficient to significantly affect the electrical resistivity of the body. It is further preferred that strontium be present in an amount of about 0.3 of the magnesium.

Preferably the body is U-shaped having the tip portion at the curved end and connector portions at each leg of the other end.

It is also preferred that the holder block be formed of a thermally shock-resistant material such as cordierite.

It is preferred that the current transmitting means include a pair of lead wires each having a terminal end and a connector end, the connector ends being attached to the connector portions of the body. The current transmitting means also includes a pair of holes or slots in the body for receiving the connector ends of the lead wires, and a metallic layer over the connector ends for sealing the connector ends into the holes or slots in the body.

The method for producing the ceramic ignitor of this invention comprises the steps of reacting oxides, carbonates, hydroxides or chlorides of lanthanum, chromium, magnesium, niobium, or strontium, in aqueous solution or suspension in proportions to provide a thick slurry of the composition, $La_{1-x} Sr_a Mg_b Nb_c CrO_3$ where $x=a+b+c$ and $a=0$ to 0.2, $b=0$ to 0.5 and $c=0$ to 0.05; drying the thick slurry into a loose cake; compressing the cake into a dense mass; calcining the mass; crushing the calcined mass in acetone or water to finely ground particles; drying the particles; mixing the dry particles with a binder; drying the mixture to form a powder; forming the powder into a shaped body; drying the body to allow the binder to set; firing the body at a temperature between about 1600° C. and 1800° C. for sufficient time to densify, typically one to three hours; attaching lead wires to the body; and mounting the body and lead wires into a ceramic holder block.

It is also preferred that the cake be compressed at a pressure of 10,000 to 30,000 psi, and that the calcining be carried out at a temperature between 1200° and 1500° C. for a sufficient time to react the powder.

The calcined mass is normally crushed by ball-milling with aluminum balls to a particle size of less than about 325 mesh.

The preferred binder is an aqueous solution of polyvinyl alcohol and polyethylene glycol, with the most desired solution containing from 5 to 15% of a polyvinyl alcohol solution and from 5 to 15% polyethylene glycol. The solution of polyvinyl alcohol is in the ratio of about 7 parts water to about 1 part polyvinyl alcohol. With the preferred binder, the mixture of dry particles and binder is in a ratio of 1 to 1, and the binder and particles are mixed at about 80° C. for at least two hours. Also, when the preferred binder is used, the body is dried at about 125° C. for about 20 hours.

It is also preferred that the powder be screened into a free-flowing form before being formed into a shaped body. Particles larger than about 35 mesh and smaller than about 200 mesh are removed for this purpose.

With the preferred binder, the shaped body is dried between about 150° C. and 200° C. for approximately twelve hours.

The forming step also includes compressing the powder at a pressure from about 15,000 to about 25,000 psi, and the firing is conducted in a neutral to slightly reducing atmosphere or in air.

The materials for forming the ignitors of the present invention include pure lanthanum chromite and lanthanum chromite which has been modified by substituting bivalent and pentavalent ions in the Perovskite lattice of the chromite crystal.

The lanthanum chromite is modified by substituting magnesium ions for some of the chromium ions therein, and also by substituting pentavalent niobium, tantalum or thallium ions for some of the lanthanum or chromium ions, in amounts sufficient to significantly affect the electrical resistivity of the chromite. It is preferred that the pentavalent element be niobium.

It is preferred that the lanthanum chromite be further modified by substituting strontium ions for some of the lanthanum ions therein.

Preferably the ratio of substituted strontium ions to substituted magnesium ions in the modified lanthanum chromite is about 0.3.

BRIEF DESCRIPTION OF THE DRAWINGS

The accompanying drawings, which are incorporated in and constitute a part of this specification, illustrate one embodiment of the invention and, together with the description, serve to explain the principles of the invention. Of the drawings.

DESCRIPTION OF THE PREFERRED EMBODIMENT

Reference will now be made in detail to the present preferred embodiment of the invention, an example of which is illustrated in the accompanying drawings.

Figure 1:
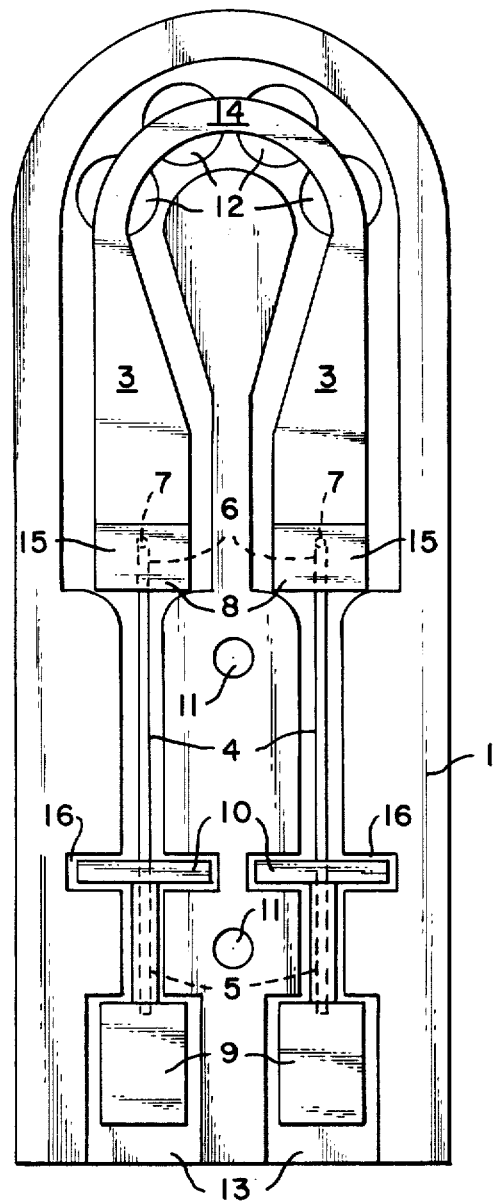
FIG. 1 is a cutaway plan view of the preferred ceramic ignitor embodiment of this invention with the top half of the holder block removed.
Figure 2:
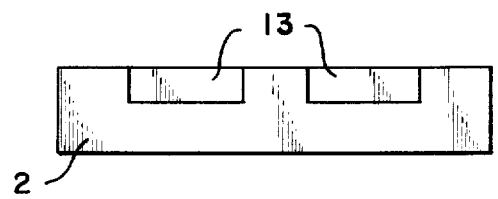
FIG. 2 is an end view of the top half of the block showing the cut-out area which mates with the similar area on the bottom half of the block.

Referring now to FIGS. 1 and 2, it may be seen that the ceramic ignitor includes a ceramic holder or mounting block 1, 2; an electrically conductive body 3 mounted in the block 1, 2, and having the composition $La_{1-x} Sr_a Mg_b Nb_c CrO_3$ where $x=a+b+c$ and $a=0$ to 0.2, $b=0$ to 0.5 and $c=0$ to 0.05; and means attached to the body 3 and mounted in the block 1, 2 for transmitting an electric current through the body. In accordance with the invention the holder block has at least one opening 12 therein for exposing the body to the medium to be ignited, and the preferred embodiment of FIG. 1 has four or more such openings.

Preferably the composition of the conductive body or ignitor element includes an amount of both magnesium and niobium sufficient to significantly affect the electrical resistivity of the body, up to approximately the above stated values of 0.5 for b and 0.05 for c. It is further preferred that b = an effective amount up to 0.05 and c = an effective amount up to 0.005. The composition may also include an amount of strontium equal to about 0.3 times the amount of magnesium present. Methods for producing these compositions are set forth in greater detail below.

Preferably the holder 1, 2 is formed of a thermally shock-resistant material such as cordierite. The electrically conductive body is preferably U-shaped with a tip portion 14 at the curved end and connector portions 15 at each leg of the other end. The tip portion 14 is exposed to the medium to be ignited by the openings 12 in the two halves of the holder block 1, 2.

As embodied herein and as shown in FIG. 1 the current transmitting means comprises a pair of lead wires 4 each having a terminal end 5 and a connector end 6. A pair of holes 7 are provided in the body 3 for receiving the connector ends of the lead wires.

A metallic layer 8 is also preferably provided over the connector ends 6 of the lead wires to seal those ends into the body. Preferably the wires 4 are formed of 20 gauge nichrome, and the metallic layer may be either a flame sprayed, galvanized or fritted nichrome or silver coating.

As here embodied, the current transmission means also includes a pair of terminals 9 connected to the terminal ends 5 of the lead wires. The terminals 9 are mounted in cut-outs 13 of the block 1, 2. It is preferred that the terminals 9 be solderless, and include insulation grips 10 thereon for holding the wires in the block.

The top half 2 of the holder block is held in place against the bottom half by a pair of rivets (not shown) through both halves in holes 11.

As previously discussed, the ignitor element of the ceramic ignitors of this invention may be formed from electrically conductive bodies of pure lanthanum chromite, or of lanthanum chromite which has been doped with magnesium, niobium, or strontium ions in amounts sufficient to significantly affect the electrical resistivity of the modified chromite.

Unmodified lanthanum chromite has a low room temperature conductivity. As a result, the use of such unmodified lanthanum chromite in ignitor applications requires that the electrically conductive chromite body have a very small cross section or that a higher voltage be used to overcome the initially high resistance if satisfactory response times are to be achieved. In addition, ignitors constructed of unmodified lanthanum chromite must be fired in a reducing atmosphere to obtain the necessary strength and density in the conductive body.

In accordance with the invention, and as further described in the examples below, the modified lanthanum chromite preferably used to construct the ignitor element of the ceramic ignitor of the present invention is formed by substituting bivalent magnesium ions and pentavalent niobium, tantalum or thallium ions for the lanthanum and/or chromium ions in the Perovskite lattice of the lanthanum chromite crystal structure in amounts sufficient to significantly affect the electrical resistivity of the chromite material. The specific combination of these doping agents produces a modified chromite material having electrical resistivity and strength characteristics particularly suited to the construction of the ceramic ignitor herein. In addition, faster ignitor response times are achieved with this doped material. Generally, this substitution may be accomplished by adding oxides, carbonates, hydroxides, or chlorides of magnesium and a suitable pentavalent element such as niobium to an aqueous chromium trioxide ($CrO_3$) solution, neutralizing the solution with lanthanum oxide ($La_2O_3$), drying the solution, compressing the dry material, and calcining the resultant product in air or a neutral to slightly reducing atmosphere.

The resulting modified chromite may then be processed into shaped bodies having the desired characteristics for ceramic ignitor construction. The presence of the magnesium ions in the lanthanum chromite lattice promotes the electrical conductivity of the chromite, allowing the use of a larger, more practically sized body than is possible with unmodified chromite. The pentavalent ions in the chromite lattice act as blocking agents which compensate for some of the charge imbalance and allow for greater amounts of magnesium to be substituted without increasing the conductivity beyond a level suitable for ceramic ignitor operation at line voltage. The use of this modified lanthanum chromite in ceramic ignitor construction results in significant advantages in both the strength and resistivity characteristics of such ignitors and improved response times in comparison with prior art ignitors.

Tantalum and thallium may also be used as pentavalent blocking agents with suitable results being realized in electrical properties as with the niobium containing formulation. However, the physical strength of thallium-containing ignitors of the preferred size is less than that of ignitors with the niobium. The tantalum containing ignitors showed a relatively higher amperage in the preferred size than desired.

In accordance with the invention, the modified lanthanum chromite material above may be further modified by substituting strontium ions for some of the lanthanum ions in the chromite. This is accomplished by replacing a portion of the magnesium ion bearing additive in the initial chromium trioxide solution with an oxide, carbonate hydroxide or chloride of strontium. The large size strontium ions (1.12 A°) substitute for lanthanum (1.14 A°) in the A-site of the lanthanum chromite lattice and cause the room temperature conductivity of the modified material to increase without significantly effecting the strength or density of conductive bodies formed from that material. This three-ion doped material results in an ignitor having unexpected and significantly improved response times over the prior art. It is preferred that about 30% of the magnesium be replaced by strontium to achieve the optimum response time and conductivity characteristics at line voltage. However, other percentages will provide suitable ignitor properties using more current. Response times as low as 8 seconds at line voltage were achieved with ignitors using material having various percentages of strontium, magnesium and niobium ions in the lanthanum chromite.

In accordance with the invention, the method of producing the ignitor element generally requires reacting acid soluble formulas such as oxides, carbonates, hydroxides or chlorides of lanthanum, chromium, magnesium, niobium, or strontium, in aqueous solution or suspension in specific proportions to provide the lanthanum chromite or modified lanthanum chromite as previously discussed. The ion substitution is made stoichiometrically by reacting a specified molar concentration of the desired constituents in which either the chromium or lanthanum concentration has been reduced by the precise molar amount desired to be substituted. The precise amount of substitution is dependent on the electrical and physical properties desired in the finished ignitor. Ignitor elements with suitable properties can be produced from material having from 0 to 0.2 molar percent strontium, 0 to 0.5 molar percent magnesium, and 0 to 0.05 molar percent niobium in the lanthanum chromite lattice. When the material contains magnesium and niobium in amounts which significantly affect the electrical resistivity, response times of substantially less than 30 seconds are consistently achieved. The further addition of strontium up to 0.2 molar percent as a replacement for some of the magnesium results in a much greater reduction in response time to the range of 8 to 20 seconds.

The slurry which results from the above reaction is dried into a loose cake by either pan drying overnight or spray drying. The cake is then compressed into dobies or briquettes at a pressure of about 10,000 to 30,000 psi. Higher pressures in this range will produce a more dense final ignitor element. The dobies are next calcined at a temperature from 600° C. to about 1500° C. for six hours. The dobies are then crushed in a jaw crusher, and ball-milled with $Al_2O_3$ media in acetone or water to a desired particle size, typically less than 325 mesh. The particles are then dried and mixed with a suitable binder.

If the preferred binder is used, the powder is suspended in water with 15% by weight of a 7:1 water-polyvinyl alcohol solution and 15% carbowax (polyethylene glycol) added. After drying, the powder may be screened to a size range between about 35 mesh and 200 mesh to leave a free-flowing powder. This accommodates a continuous industrial-type assembly process by allowing powder to flow into steel dies for pressing to the desired ignitor body shapes.

The preferred shape is in the form of a U, the curved portion being exposed to the ignition medium by the openings in the holder block. A force between 15,000 and 25,000 psi is suitable for pressing the ignitor body shapes. The bodies are then dried to allow the binder to set. The preferred binder requires a drying time of about twelve hours at a temperature of about 150° to 200° C.

The bodies may then be drilled at the connector ends for later insertion of the lead wires. The drilled bodies are fired at a temperature between 1600° and 1800° C. for sufficient time to densify, typically one to three hours in a neutral to slightly reducing atmosphere. Lead wires, preferably 20 gauge nichrome, are then sealed into the drilled holes by flame spraying galvanizing or fritting of the connector areas with nichrome metal. This design provides an increased cross section of the connector end thereby decreasing the resistance at the joint between the lanthanum chromite and the wire. As a result, the connector ends stay relatively cool, and the ceramic-metal joint is more reliable over the extended use required with the ceramic ignitor.

Silver metal, in the form of a fired-on frit, may also be used at the connector area to seal the lead wires.

Male terminals having an insulation grip are preferably used at the terminal ends of the lead wires. These terminals are crimped to the lead wires, and the entire body and wire assembly is mounted into the cut-out area of the bottom half holder block 1. The insulation grips 10 fit into prepared recesses 16 in the holder block and serve to hold the terminals firmly in the block. This design adds to ignitor life since it reduces the possibility of the terminals and wires being torn out of the ignitor as the ignitor is unplugged.

The top half 2 of the holder block is a reverse image of the bottom half 1 and mates with the adjoining surfaces of the bottom half. In the preferred embodiment of FIG. 1, two holes 11 are provided for mounting rivets which seal the block halves together. The top half 2 also has openings therein (not shown) which correspond to those in the bottom half, for exposing the conductive body to the medium to be ignited.

The present invention will be more clearly understood with references to the following examples which illustrate the best modes of practicing the invention, but which should not be construed as a limitation upon the scope of the invention.

EXAMPLE 1

1.75 gr of $Mg(OH)_2$ was dissolved in an aqueous solution of 97.01 gr/liter chromium trioxide. Then 162.92 gr of $La_2O_3$ was added slowly to the rigorously stirred solution. The container was water-cooled during the exothermic neutralization process. The formed yellow cake of lanthanum chromite was then dried in a spray dryer at no more than 365° C. inlet and 140° C. outlet temperature. The dried cake was then pressed into dobies or briquettes which were subsequently calcined at 1500° C. in air with a six hour soak period. The calcined dobies were first fed through a jaw crusher and then ball milled with $Al_2O_3$ media in acetone for four hours. After wet screening through a 325 mesh screen, the powder was mixed with binder and lubricant agents. The powder was suspended in water before 15% by weight of 7:1 PVA solution and 15% of Carbowax 400 was added. The suspension was then dried in a spray dryer at 150° C. outlet temperatures. After screening through a 35 and 150 mesh screen, the powder retained on the 150 mesh screen was pressed into a flame ignitor shape. The pressed parts were dried overnight and then fired in a gas fired furnace at 1800° C. for two hours in a slightly reducing atmosphere. The physical properties of the produced flame ignitor were typically 1.73 amp and 25 seconds response time. The bulk density of this composition was 83.7% of the theoretical density. The MOR (modulus of rupture) strength of the material fired at 1800° C. for two hours was is 4400 psi.

EXAMPLE 2

1.75 gr of $Mg(OH)_2$ and 0.503 gr of $Nb_2O_5$ were dissolved in one liter aqueous solution of 96.60 gr/liter chromium trioxide. The 162.92 gr of $La_2O_3$ was added according to the process described in Example 1. The flame ignitor prepared from these chrome deficient formulations indicated a current demand of 1.08 amps at a response time of 30 seconds. The bulk density of the niobium containing material was 89.73% of the theoretical value. Both the amperage and the density of the ignitors were improved compared to Example 1. The MOR strength was also improved to 5400 psi.

EXAMPLE 3

1.75 of $Mg(OH)_2$ and 0.503 gr of $Nb_2O_5$ were dissolved in one liter of a one mole per liter aqueous chromium trioxide solution (100 gr $CrO_3$/l). Then 157.38 gr of $La_2O_3$ was added as outlined in the Example 1 procedure. The physical properties of the ignitors prepared from this lanthanum deficient formulation were further improved in relation to Example 2. The bulk density of the ignitors was increased to 94.83% of the theoretical value. The current demand was stable at 1.11 amps with a response time of 25 seconds. The MOR strength of this lanthanum deficient material increased to 10,500 psi.

EXAMPLE 4

In this example, the buffer agent niobium was replaced by another pentavalent element, tantalum. 1.75 gr of Mg(OH)$_2$ and 0.88 gr of Ta$_2$O$_5$ were dissolved in an aqueous solution of 97.01 gr/liter chromium trioxide which is described in Example 1. The bulk density of the material was only 75.0% of the theoretical density. Therefore the MOR strength was very low at about 2500 psi. The electrical properties of the tantalum doped material showed an amperage demand of 1.35 amps.

EXAMPLE 5

The stoichiometric formulation of lanthanum chromite was synthesized following the procedure of Example 1. 162.92 gr of La$_2$O$_3$ was used to neutralize 100.02 gram of CrO$_3$ dissolved in 1 liter water. The finished ignitor material prepared from this starting compound indicated a very low MOR of 1450 psi. The ignitors pressed from the stoichiometric material could not be heated up from room temperature at line voltage because of the very high resistance (about 50–100Ω/cm.) of this unmodified material. A smaller conductive body or a higher voltage would provide a suitable heat-up response.

EXAMPLE 6

A one mole batch of 257.38 gram of lanthanum deficient lanthanum chromite was doped with 1.755 gr magnesium hydroxide and 1.076 gr of niobium chloride by reacting 157.38 gr lanthanum oxide with 100 gr of chromium trioxide (CrO$_3$) in an aqueous solution. The resultant yellow slurry was dried overnight in a pan. It could also have been spray dried. The powder was pressed or pelletized before it was calcined at 1500° C. for six hours to form a green material. The calcined pellets were crushed and ball milled in acetone to less than 325 mesh. After drying, the powder was mixed in water with 15 weight percent of a 7:1 water-PVA solution and 15 weight percent of Carbowax. After intense mixing, the slurry was dried overnight in a pan. It could also have been spray dried. The powder was sized by screening through 35 and 200 mesh screens, the material retained on the 200 mesh screen being a free-flowing material ready for pressing. The ignitor parts were pressed in a steel die at 15,000 psi and then dried overnight at about 200° C. After the setting of the binder, the ignitor parts were drilled at the connector ends to fit the electrical connection wire. The drilled parts were high fired at 1800° C. for three hours in a neutral to slightly reducing atmosphere. The fired parts were subsequently wired at the connector ends and flame sprayed with nichrome metal. The ignitor was then mounted in a cordierite block after terminals were connected to the wire ends. The electrical properties of the finished ignitor at line voltage were typically 1.20 amperage with a 25 second response time to heat from room temperature to the maximum temperature (2600° F.).

EXAMPLE 7

A batch of lanthanum deficient lanthanum chromite was prepared as described in Example 6 with the difference that one third of the magnesium doping was replaced by strontium. The exact amounts used for one mole of lanthanum chromite are 1.175 gr Mg(OH)$_2$, 1.477 gr SrCO$_3$ and 1.076 gr NbCl$_5$. The finished ignitors of this formulation drew 1.20 amps at 120 volts, and indicated a response time of 18 seconds, which is about 30% shorter than for the ignitors prepared from the formulation in Example 6.

EXAMPLE 8

One mole batch of lanthanum deficient lanthanum chromite was synthesized as described in Example 6 but two thirds of the magnesium doping was replaced by strontium. The quantities used in the formulation were 0.58 gr Mg(OH)$_2$, 1.076 gr NbCl$_5$ and 2.939 gr Sr CO$_3$. The test samples of this batch yielded a much higher amperage in the range of 1.75 at line voltage. Ignitors prepared from material described in Example 7 with the same amperage responded within 10 seconds, whereas material synthesized according to Example 8 needed 13 seconds.

EXAMPLE 9

Another one mole batch of lanthanum deficient material was prepared according to the process described in Example 6. The batch included the magnesium and strontium dopant in equal quantities and 20% more niobium for additional buffering. The quantities used in the formulation were 1.175 gr Mg(OH)$_2$, 2.939 gr SrCO$_3$, and 1.339 gr NbCl$_5$. Ignitors prepared from this formulation indicated a typical 1.95 amperage with a 12 second response time. At the same high amperage, the response time of Example 6 ignitors was 17 seconds, Example 7, 8 seconds, and Example 8, 10 seconds.

The present invention has been disclosed both generally and by example thereby providing one skilled in the art the means to practice the present invention. The scope of the invention is not intended to be limited by the examples disclosed herein. The scope of the invention is to be ascertained from the appended claims as read in light of the foregoing Specification.

What is claimed is:

1. A fast response constant voltage ceramic ignitor comprising:
    a ceramic holder block; an electrically conductive body mounted in said block and consisting essentially of the composition La$_{1-x}$Sr$_a$Mg$_b$Nb$_c$CrO$_3$ were $x=a+b+c$ and $a=0$ to 0.2, $b=0$ to 0.5, and $c=0$ to 0.5; and
    means attached to said body and mounted in said block for transmitting an electric current therethrough, said holder block having at least one opening therein for exposing a portion of said body to the medium to be ignited.

2. The ceramic ignitor of claim 1 wherein $a=0$ to 0.02, $b=0$ to 0.05 and $c=0$ to 0.005.

3. The ceramic ignitor of claim 2 wherein $b=$an effective amount up to 0.5 and $c=$an effective amount up to 0.05.

4. The ceramic ignitor of claim 3 wherein the ratio of a to b is about 0.3.

5. The ceramic ignitor of claim 4 wherein said holder block is formed of a thermally shock-resistant material.

6. The ceramic ignitor of claim 5 wherein said holder block is formed of cordierite.

7. The ceramic ignitor of claim 6 wherein said electrically conductive body is U-shaped, said body having a tip portion at the curved end and connector portions at each leg of the other end.

8. The ceramic ignitor of claim 7 wherein said current transmitting means includes a pair of lead wires each having a terminal end and a connector end, said wires being attached to the connector portions of said body at the connector ends thereof.

9. The ceramic ignitor of claim 8 wherein said current transmitting means also includes a pair of holes in said body for receiving said connector ends of said lead wires, and a metallic layer over said connector ends for sealing the connector ends into said body.

10. The ceramic ignitor of claim 9 wherein said lead wires are nichrome.

11. An article comprising an electrically conductive ignitor element having the composition $La_{1-x} Sr_a Mg_b Nb_c CrO_3$ where $x=a+b+c$ and $a=0$ to 0.02, $b=$an effective amount up to 0.05, and $c=$an effective amount up to 0.005.

* * * * *